(12) United States Patent
Zajaczkowski et al.

(10) Patent No.: US 10,100,233 B2
(45) Date of Patent: Oct. 16, 2018

(54) PRESSURE SENSITIVE ADHESIVES

(75) Inventors: Michael J. Zajaczkowski, Bellefonte, PA (US); Christopher Lee Lester, Mill Hall, PA (US)

(73) Assignee: Avery Dennison Corporation, Glendale, CA (US)

( * ) Notice: Subject to any disclaimer, the term of this patent is extended or adjusted under 35 U.S.C. 154(b) by 1271 days.

(21) Appl. No.: 12/531,547

(22) PCT Filed: Mar. 20, 2008

(86) PCT No.: PCT/US2008/057574
§ 371 (c)(1),
(2), (4) Date: Sep. 16, 2009

(87) PCT Pub. No.: WO2008/116033
PCT Pub. Date: Sep. 25, 2008

(65) Prior Publication Data
US 2010/0120931 A1    May 13, 2010

Related U.S. Application Data

(60) Provisional application No. 60/896,011, filed on Mar. 21, 2007, provisional application No. 60/896,349, filed on Mar. 22, 2007, provisional application No. 60/975,890, filed on Sep. 28, 2007.

(51) Int. Cl.
*C09J 133/14* (2006.01)

(52) U.S. Cl.
CPC ......... *C09J 133/14* (2013.01); *C08L 2312/00* (2013.01)

(58) Field of Classification Search
CPC ........................... C08J 133/14; C08L 2312/00
USPC ......... 521/134, 138, 139, 149; 525/54.4, 55, 525/100, 123, 217, 227, 279, 308, 313, 525/319, 360, 370, 379; 524/560
See application file for complete search history.

(56) References Cited

U.S. PATENT DOCUMENTS

| | | | |
|---|---|---|---|
| 4,554,324 A | 11/1985 | Husman et al. | |
| 4,593,068 A | 6/1986 | Hirose et al. | |
| 4,687,818 A | 8/1987 | Kawakubo et al. | |
| 5,057,366 A | 10/1991 | Husman et al. | |
| 5,508,372 A * | 4/1996 | Brahm et al. | 528/80 |
| 5,705,561 A | 1/1998 | Kozakiewicz et al. | |
| 8,063,144 B2 * | 11/2011 | Wamprecht et al. | 525/123 |
| 2006/0057366 A1 * | 3/2006 | Husemann et al. | 428/343 |
| 2006/0079645 A1 * | 4/2006 | Hasegawa et al. | 525/191 |
| 2006/0111539 A1 * | 5/2006 | Wamprecht et al. | 528/44 |
| 2008/0202662 A1 * | 8/2008 | Husemann et al. | 156/60 |

FOREIGN PATENT DOCUMENTS

| | | |
|---|---|---|
| EP | 1 693 430 | 8/2006 |
| JP | 2003-329837 | 11/2003 |
| RU | 2266941 | 12/2005 |

OTHER PUBLICATIONS

International Search Report and Written Opinion issued in PCT/US2008/057574 dated Sep. 9, 2008.
Reply to ISA Written Opinion filed in PCT/US2008/057574 dated Jan. 6, 2009.
Written Opinion of the International Preliminary Examining Authority issued in PCT/US2008/057574 dated Mar. 5, 2009.
International Preliminary Report on Patentability issued in PCT/US2008/057574 dated Jul. 3, 2009.

* cited by examiner

*Primary Examiner* — John Cooney
(74) *Attorney, Agent, or Firm* — Avery Dennison Corporation

(57) ABSTRACT

A pressure sensitive adhesive formed from a blend of an acrylate polymer having at least one crosslinkable functional group, and a liquid oligomer having at least one crosslinkable functional group, wherein at least one of the acrylate polymer and the oligomer is crosslinked in the presence of the other.

36 Claims, No Drawings

PRESSURE SENSITIVE ADHESIVES

This application claims the benefit of International Application Number PCT/US2008/057574, which was published in English on Sep. 25, 2008, which claims priority to provisional patent application Ser. Nos. 60/896,011 filed Mar. 21, 2007; 60/896,349 filed Mar. 22, 2007; and 60/975,890 filed Sep. 28, 2007, the contents of which are incorporated herein by reference in their entirety.

TECHNICAL FIELD

The present invention is directed to a pressure sensitive adhesive composition, and more particularly, to a pressure sensitive adhesive having high adhesion over a wide temperature range. The invention is further directed to foam articles incorporating the pressure sensitive adhesive composition.

SUMMARY

In one embodiment, the pressure sensitive adhesive is formed from a blend comprising: (a) an acrylate polymer having at least one crosslinkable functional group, the acrylate polymer having a Tg less than 20° C. and a molecular weight ($M_w$) greater than 20,000; (b) an oligomer having at least one crosslinkable functional group, wherein the oligomer is liquid at room temperature; and (c) at least one crosslinking agent; wherein at least one of (a) and (b) is crosslinked in the presence of the other.

The acrylate polymer and the oligomer of the adhesive are compatible. The polymer may further include a tackifier that is compatible with the blend of the acrylate polymer and oligomer.

In one embodiment, the pressure sensitive adhesive is formed from a blend comprising: (a) about 30-90% by weight of an acrylate polymer having at least one crosslinkable functional group, the acrylate polymer having a Tg less than 20° C. and a molecular weight ($M_w$) greater than 20,000; (b) about 5-50% by weight of an oligomer having at least one crosslinkable functional group, wherein the oligomer is liquid at room temperature; and (c) at least one crosslinking agent; wherein at least one of (a) and (b) is crosslinked in the presence of the other.

In another embodiment, a foam article is formed from a blend comprising (a) an acrylate polymer having at least one crosslinkable functional group, the acrylate polymer having a Tg less than 20° C. and a molecular weight ($M_w$) greater than 20,000; (b) an oligomer having at least one crosslinkable functional group, wherein the oligomer is liquid at room temperature; (c) at least one crosslinking agent; and (d) expandable microspheres; wherein at least one of (a) and (b) is crosslinked in the presence of the other.

DETAILED DESCRIPTION

The pressure sensitive adhesive of the present invention comprises a blend of (a) an acrylate polymer having at least one crosslinkable functional group, the acrylate having a Tg less than 20° C. and a molecular weight ($M_w$) greater than 20,000; (b) an oligomer having at least one crosslinkable functional group, wherein the oligomer is liquid at room temperature; and (c) at least one crosslinking agent, wherein at least one of the acrylate polymer and the oligomer is crosslinked in the presence of the other.

As used herein, the term "liquid at room temperature" means a polymer that undergoes a degree of cold flow at room temperature. Cold flow is the distortion, deformation or dimensional change that takes place in materials under continuous load at temperatures within the working range. Cold flow is not due to heat softening. Polymers with Mw less than 500,000 and a Tg (excluding hard segments) of less than about 25° C. experience cold flow at room temperature.

In one embodiment, the pressure sensitive adhesive comprises a blend of (a) an acrylate polymer having at least one crosslinkable functional group, the acrylate having a Tg less than 20° C. and a molecular weight ($M_w$) greater than 20,000; and (b) an oligomer chosen from (meth)acrylate, polyisobutylene, poly-alpha-olefin, polybutadiene, polyisoprene, polydimethylsiloxane, polyalkyloxazoline, polyester and polyurethane, the oligomer having at least one crosslinkable functional group, wherein the oligomer is liquid at room temperature; wherein at least one of the acrylate polymer and the oligomer is crosslinked in the presence of the other.

In one embodiment, the pressure sensitive adhesive formed from a blend comprising: (a) an acrylate polymer having a Tg less than 20° C. and a molecular weight ($M_w$) greater than 20,000; and (b) an oligomer chosen from (meth)acrylate, polyisobutylene, poly-alpha-olefin, polybutadiene, polyisoprene, polydimethylsiloxane, polyalkyoxazoline, polyester, and polyurethane, the oligomer having at least one crosslinkable functional group, wherein the oligomer is liquid at room temperature; wherein the oligomer is crosslinked in the presence of the acrylate polymer.

The adhesives of the present invention meet the Dahlquist criteria, indicating their suitability as a pressure sensitive adhesive. According to what has come to be known as the Dahlquist criteria, to be a pressure sensitive adhesive, the formulation must have a plateau shear modulus at 25° C. at 1 radian per second that is between $1 \times 10^5$ and $6 \times 10^6$ dynes/cm$^2$, preferably from $1 \times 10^5$ and $3 \times 10^5$ dynes/cm$^2$ as determined by dynamic mechanical spectroscopy. A material stiffer than this, that is, a material that has a plateau shear modulus at 25° C. of $1 \times 10^7$ dynes/cm$^2$ will not exhibit surface tack at room temperature. A material less stiff than this, that is, a material that has a plateau shear modulus at 25° C. of $1 \times 10^4$ dynes/cm$^2$ will lack sufficient cohesive strength to be useful as a pressure sensitive adhesive.

Acrylic Base Polymer

The acrylic base polymer is compatible with the liquid oligomer. Compatibility can be determined by observing how blending affects the glass transition temperature (Tg). Miscible blends will display a single Tg at a temperature between the glass transition temperatures of the respective components. Compatibility is described in *Dynamic Mechanical Analysis,* 1999 CRC Press LLC, by Kevin P. Menard, which is incorporated by reference herein. The acrylic base polymer has a glass transition temperature (Tg) less than 20° C. In one embodiment, the Tg is less than 0° C. The acrylic polymer has a weight average molecular weight ($M_w$) greater than about 20,000. in one embodiment, the acrylic polymer has a molecular weight greater than about 50,000, or greater than about 100,000.

The acrylic polymer may be derived from acrylates, methacrylates, or mixtures thereof. The acrylates include $C_1$ to about $C_{20}$ alkyl, aryl or cyclic acrylates such as methyl acrylate, ethyl acrylate, propyl heptyl acrylate, phenyl acrylate, butyl acrylate, 2-ethylhexyl acrylate, isobornyl acrylate and functional derivatives of these acrylates such as 2-hydroxy ethyl acrylate, 2-chloro ethyl acrylate, and the like. These compounds typically contain from about 3 to about 20 carbon atoms, and in one embodiment about 3 to about 8 carbon atoms. The methacrylates include $C_1$ to about $C_{20}$ alkyl, aryl or cyclic methacrylates such as methyl methacrylate, ethyl methacrylate, butyl methacrylate, 2-ethylhexyl methacrylate, phenyl methacrylate, isobornyl methacrylate, and functional derivatives of these methacrylates such as 2-hydroxyethyl methacrylate, 2-chloroethyl methacrylate, and the like. These compounds typically contain from about 4 to about 20 carbon atoms, and in one embodiment about 4 to about 8 carbon atoms.

The acrylic polymer may be a copolymer derived from at least one acrylate monomer and at least one polymerizable comonomer. The polymerizable comonomers include acrylonitriles, acrylamides, methacrylamides, vinyl esters, vinyl ethers, vinyl amides, vinyl ketones, styrenes, halogen containing monomers, ionic monomers, acid containing monomers, base containing monomers, monomers having both a reactive silicon containing group and a polymerizable unsaturated group, olefins, and mixtures of two or more thereof.

The acrylonitriles include acrylonitrile and alkyl substituted acrylonitriles. The alkyl groups typically contain from 1 to about 20 carbon atoms, and in one embodiment 1 to about 10 carbon atoms, and in one embodiment 1 to about 5 carbon atoms. Examples include methacrylonitrile and ethacrylonitrile.

The acrylamides include acrylamide and its derivatives including the N-substituted alkyl and aryl derivatives thereof. These include N-methyl acrylamide, N,N-dimethyl acrylamide, t-octyl acrylamide and the like. The methacrylamides include methacrylamide and its derivatives including the N-substituted alkyl and aryl derivatives thereof. The vinyl esters include vinyl acetate, vinyl propionate, vinyl butyrate, vinyl valerate, vinyl versitate, vinyl isobutyrate and the like. The vinyl ethers include vinyl ethers having 1 to about 8 carbon atoms including ethylvinyl ether, butylvinyl ether, 2-ethylhexylvinyl ether and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like.

Examples of styrene containing monomers include methyl styrene (sometimes referred to as vinyl toluene), alpha-methyl styrene, divinylbenzene, chlorostyrene, chloromethyl styrene, and the like.

The halogen-containing monomers include vinyl chloride, vinyl bromide, vinyl fluoride, vinylidene chloride, vinylidene bromide, vinylidene fluoride, halogen substituted propylene monomers, and the like. The ionic monomers include sodium vinyl sulfonate, sodium styrene sulfonate, sodium methallyl sulfonate, sodium acrylate, sodium methacrylate, and the like.

The acid containing monomers include unsaturated carboxylic acids containing from 3 to about 20 carbon atoms. The unsaturated carboxylic acids include, among others, acrylic acid, methacrylic acid, itaconic acid, beta carboxy ethyl acrylate, mono-2-acroyloxypropyl succinate, and the like.

The ether containing monomers include ethoxyethoxy ethyl acrylate and methoxypolypropyleneoxide mono(meth)acrylate and the like.

Anhydride containing monomers include maleic anhydride, itaconic anhydride, citraconic anhydride and the like.

The base containing monomers include vinyl pyridine, N-amino ethyl acrylamide, N-amino propyl acrylamide, N-aminoethyl acrylate, N-aminoethyl methacrylate, and the like. The polymerizable silanes include vinyltrimethoxysilane, vinyltriethoxysilane, vinyltripropoxysilane, vinylmethyldimethoxysilane, vinylmethyldiethoxysilane, vinylmethyldipropoxysilane, γ-methacryloxypropyltrimethoxysilane, γ-methacryloxypropyltriethoxysilane, γ-methacryloxypropyltripropoxysilane, γ-methacryloxydimethoxysilane, γ-methacryloxypropylmethyldimethoxysilane, γ-methacryloxypropylmethyldiethoxysilane, γ-methacryloxypropylmethyldipropoxysilane, γ-methacryloxymethyldimethoxysilane, γ-methacryloxymethyltrimethoxysilane, γ-methacryloxymethyltriethoxysilane, (methacryloxymethyl)methyldimethoxysilane, (methacryloxymethyl)methyldiethoxysilane, γ-methacryloxypropyltriacetoxysilane, γ-acryloxypropyltrimethoxysilane, γ-acryloxypropyltriethoxysilane, γ-methacryloxymethyldiethoxysilane, γ-acryloxypropyltripropoxysilane, γ-acryloxypropylmethyldimethoxysilane, γ-acryloxypropylmethyldiethoxysilane, γ-acryloxypropylmethyldipropoxysilane, and the like. The olefins include isoprene, butadiene, $C_2$ to about $C_8$ straight chained and branched alpha-olefins such as ethylene, propylene, butylene, isobutylene, diisobutylene, 4-methyl pentene-1,1-butene, 1-hexene, 1-octene, and the like.

The crosslinkable functional group of the acrylic polymer is not particularly restricted, but may include crosslinkable silyl, hydroxyl, carboxyl, isocyanato, vinyl, (meth)acryl, epoxyl, amino, mercapto and acetoacetyl groups.

In one embodiment, the acrylic copolymer may be formed using a macromonomer (also referred to as "macromer"). Examples of macromers suitable for increasing cohesive strength are disclosed in U.S. Pat. Nos. 4,554,324 and 5,057,366, which are incorporated by reference herein. The macromonomer may be represented by the general formula:

$$X\text{—}(Y)_n\text{—}Z \quad (I)$$

wherein X is a vinyl group copolymerizable with the other monomers present in the acrylic base polymer composition; Y is a divalent linking group where n can be 0 or 1; and Z is a monovalent polymeric moiety having a Tg greater than 20° C. and a weight average molecular weight in the range of about 2,000 to about 30,000 and being essentially unreactive under copolymerization conditions.

In one embodiment, the X group has the general formula:

(II)

wherein R is a hydrogen atom or a COOH group and R' is a hydrogen atom or a methyl group. The Z group, in one embodiment, has the general formula:

(III)

wherein $R^2$ is a hydrogen atom or a lower alkyl group, $R^3$ is a lower alkyl group, n is an integer from 20 to 500 and $R^4$ is a monovalent radical selected from the group consisting of

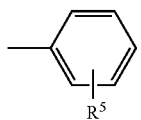

and —CO$_2$R$^6$, wherein R$^5$ is a hydrogen atom or a lower alkyl group and R$^6$ is a lower alkyl group.

The macromonomer may be crosslinkable. As used herein, the term "crosslinkable macromonomer" means relatively low molecular weight, e.g., about 1,000 to about 30,000, copolymers containing a copolymerizable vinyl end group and crosslinkable moieties. Examples of macromonomers (or macromers) include copolymers of an alkyl methacrylate such as methyl methacrylate with a monomer providing a reactive amino, epoxy, hydroxyl and or carboxyl group and a terminal vinyl group end block, tapered or random copolymers of styrene with butadiene or isoprene that have been epoxidized and contain a terminal vinyl group and the like. The crosslinkable macromonomers generally have a relatively high Tg, about 25° C. or more, or about 50° C. or more.

The acrylic copolymer may be synthesized using solution, emulsion, and batch polymerization techniques. In one embodiment, it is preferred to prepare the copolymer in solution using a mixture of solvents. For example, a mixture of ethyl acetate and isopropyl alcohol may be used. Solids content during polymerization may typically range from about 30% to about 60% in order to achieve the desired weight average molecular weight, and yet achieve viscosities that are manageable in the reactor. The polymerization of the acrylic monomers may also take place in the presence of the liquid oligomer, thereby reducing the amount of solvent needed to maintain a suitable viscosity.

Reaction occurs in the presence of free-radical initiators, such as initiators of the azo type, for example, 2,2'-azobis(isobutyronitrile). Other initiators include peroxide initiators, including dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butyl cumyl peroxide and α, α'-bis(t-butylperoxy)isopropylbenzene, diacyl peroxides such as benzoyl peroxide, p-chlorobenzoyl peroxide, m-chlorobenzoyl peroxide, 2,4-dichlorobenzoyl peroxide, lauroyl peroxide, peroxy esters such as t-butyl perbenzoate, peroxydicarbonates such as diisopropyl peroxydicarbonate and di-2-ethylhexyl peroxydicarbonate, peroxy ketals such as 1,1-di(t-butylperoxy)cyclohexane and 1,1-di(t-butylperoxy)-3,3,5-trimethylcyclohexane and the like. Peroxyesters useful as initiators include t-amyl peroxy-2-ethylhexanoate and t-butyl peroxy-2-ethylhexanoate. A particularly useful peroxyester as a secondary initiator to reduce residual monomer is t-amyl peroxypivalate. Polymers can, as desired, be post-polymerization cross-linked using heat, actinic or electron beam radiation and the like. In addition to standard free radical techniques, the acrylic polymer may be produced by controlled radical techniques such as reversible addition-fragmentation chain transfer (RAFT) or stable free radical polymerization (SFRP).

Liquid Polymer with Crosslinkable Functionality

The pressure sensitive adhesive comprises in addition to the acrylic base polymer, an oligomer having at least one crosslinkable functional group. The oligomer is liquid at room temperature (about 25° C.). Examples of useful oligomers include those having a polymer backbone comprising polyether, polyisobutylene, amorphous poly-alpha olefins, polybutadienes, polyisoprenes, polydimethylsiloxanes, polyalkyloxazolines, polyester, poly(meth)acrylate, and polyurethane. The polyether backbones may comprise, for example, polypropylene oxide, polyethylene oxide or polytetramethylene ether glycol. The poly(meth)acrylate backbones may comprise $C_1$ to $C_{30}$ (meth)acrylate esters that may or may not include modifying monomers. Onto the polymer backbone there is attached one or more reactive functional groups. The reactive functional groups may comprise silyl, hydroxyl, carboxyl, isocyanto, vinyl, (meth)acryl, epoxyl, amino, mercapto and acetoacetyl groups. The functional group chosen for the oligomer may be reactive with the functional group of the acrylic base polymer. Alternatively, the functional group chosen for the oligomer may be self-reactive. The specific functional groups used may be determined by one skilled in the art. For example, amino groups will crosslink with isocyanto, epoxy and acetoacetyl groups; isocyanto groups will crosslink with carboxyl, amino and hydroxyl groups; (meth)acryl groups will crosslink with amino and acetoaceyl groups; epoxy groups will crosslink with amino, carboxyl and hydroxyl groups; etc.

In one embodiment, the acrylic polymer is crosslinked by a metal chelate crosslinker and the oligomer is crosslinked through the functional groups on its backbone. More than one crosslinking mechanism can be used on the acrylic polymer or the oligomer.

In general, the molecular weight of the oligomer is within the range of about 500 to about 100,000. In one embodiment, the molecular weight is within the range of about 3,000 to about 50,000. The Tg of the oligomer, prior to reaction, is generally less than 25° C.

In one embodiment, the pressure sensitive adhesive includes a liquid polymer having at least one reactive silicon containing group in the molecule. The term "reactive silicon containing group" as used herein means a silicon containing group capable of condensing or reacting by or with moisture or an additive such as a condensation or a cross-linking agent, e.g., a hydrolyzable group bonding to a silicon atom or silanol group. In one embodiment, the liquid polymer comprises a reactive silicon containing group of the general formula:

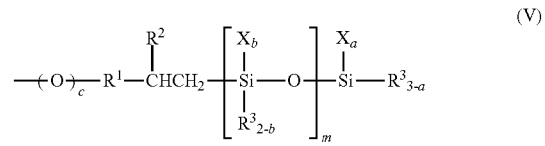

wherein R$^1$ is a bivalent organic group having 1 to 20 carbon atoms, R$^2$ is hydrogen or a monovalent organic group having 1 to 10 carbon atoms, R$^3$ is monovalent hydrocarbon group or a triorganosiloxy group, a is 0-3, b is 0-2, c is 0 or 1, with the proviso that 1≤a+b≤4, X is a hydroxyl group or a hydrolyzable group and when two or more X groups are present, they may be the same or different, and m is 0 or an integer of 1 to 18.

The hydrolyzable group X is not particularly restricted but can be a known hydrolysable group such as, for example, hydrogen, halogen, alkoxy, acyloxy, ketoximato, amino, amido, acid amido, aminoxy, mercapto and alkenyloxy.

In one embodiment, the liquid polymer is a polyether having a silicon containing functional group. The main chain of the polyether to which the silyl termination is attached may be represented by the formula —R$^4$O—, wherein R$^4$ is a bivalent organic group, preferably a bivalent hydrocarbon group having 1 to 8 carbon atoms. Examples of the bivalent hydrocarbon group $R^4$ include —$CH_2$—, —$CH_2CH_2$—, —$CH(CH_3)$—$CH_2$—, '$CH(C_2H_5)$—$CH_2$—, —$C(CH_3)_2$—$CH_2$—, —$CH_2CH_2CH_2CH_2$—, and the like. The molecular weight of the polyether is generally in the range of 500 to 50,000, preferably 3,000 to 30,000.

In one embodiment, the liquid oligomer comprises a silyl terminated polypropylene oxide having a molecular weight of 25,000 and a room temperature viscosity of 100,000 cps commercially available under the trade name SAX 725 from Kaneka Corporation. In another embodiment, the liquid oligomer comprises SAX 400 from Kaneka, which is a methoxysilyl-terminated polypropylene oxide based polyether having a molecular weight of about 10,000. Examples of commercially available silyl terminated polyacrylate oligomers include OR 100s, SA100S and RC200C from Kaneka Corporation. Examples of commercially available acrylate terminated polyacrylate oligomers include RC100C and RC200C from Kaneka Corporation. Examples of silyl terminated polyurethane oligomers include SPUR1010 and SPUR1050 from Momentive Performance Materials.

Tackifier

A tackifier may be combined with the inventive adhesive. The tackifier is substantially compatible with the acrylic polymer. As used herein, the term "substantially compatible" means that when the tackifier and the acrylic polymer are combined, the resulting combination is substantially transparent in dry film form, as opposed to opaque, to normal vision. A wide variety of tackifiers can be used to enhance the tack and peel of the adhesive. These include rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

There may also be employed terpene resins which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez 1304, manufactured by Exxon Chemical Co., and aromatic hydrocarbon resins based on $C_9$, $C_5$, dicyclopentadiene, coumarone, indene, styrene, substituted styrenes and styrene derivatives and the like can also be used.

Hydrogenated and partially hydrogenated resins such as Regalrez 1018, Regalrez 1033, Regalrez 1078, Regalrez 1094, Regalrez 1126, Regalrez 3102, Regalrez 6108, etc., produced by Eastman Chemical Company, can be used. Various terpene phenolic resins of the type SP 560 and SP 553, manufactured and sold by Schenectady Chemical Inc., Nirez 1100, manufactured and sold by Reichold Chemical Inc., and Piccolyte S-100, manufactured and sold by Hercules Corporation, are particularly useful tackifiers for the present invention. Various mixed aliphatic and aromatic resins, such as Hercotex AD 1100, manufactured and sold by Hercules Corporation, can be used.

While the resins described above are quite useful for tackifying the acrylate/oligomer blend of the instant invention, the particular tackifying resin and/or amount selected for a given formulation may depend upon the type of acrylic polymer being tackified. Many resins which are known in the prior art as being useful for tackifying acrylic based pressure sensitive adhesives can be effectively used in the practice of the present invention, although the scope of the invention is not limited to only such resins. Resins described in Satas, Handbook of Pressure Sensitive Adhesive Technology, Von Nostrand Reinhold, Co, Chap. 20, pages 527-584 (1989) (incorporated by reference herein) could be used.

The amount of tackifier used in the present invention is dependent upon the acrylate/oligomer blend and tackifier used. Typically, pressure-sensitive adhesive compositions prepared in accordance with the present invention will comprise from 5 to about 60% by weight total of one or more tackifiers.

In one embodiment, the tackifier has a ring and ball softening point of from about 100° C. to about 150° C. In one embodiment, the tackifier comprises a terpene phenolic tackifier having a ring and ball softening point of from about 110° C. to about 120° C.

In another embodiment, the added resin may serve a dual purpose. For example, a resin such as Wingstay L®, a butylated reaction product of para-cresol and dicyclopentadiene with an average molecular weight of 650 produced by Eliokem, can serve both as a tackifier and an antioxidant.

In one embodiment, a low molecular weight polymeric additive is incorporated into the adhesive composition. The polymeric additive has a softening point greater than about 40° C. and a number average molecular weight less than about 35,000. The polymeric additive is polymerized from monomers selected from $C_1$-$C_{20}$ alkyl and cycloalkyl acrylates, $C_1$-$C_{20}$ alkyl and cycloalkyl methacrylates, free-radical polymerizable olefinic acids, and optionally other ethylenically unsaturated monomers. Suitable alkyl and cycloalkyl acrylates include the various esters of acrylic acid such as methyl acrylate, ethyl acrylate, n-propyl acrylate, isopropyl acrylate, n-butyl acrylate, isobutyl acrylate, t-butyl acrylate, isobornyl acrylate, pentyl acrylate, hexyl acrylate, octyl acrylate, iso-octyl acrylate, nonyl acrylate, lauryl acrylate, stearyl acrylate, eicosyl acrylate, 2-ethylhexyl acrylate, cyclohexyl acrylate, cycloheptyl acrylate, and the like and mixtures thereof. Suitable alkyl and cycloalkyl methacrylate include the esters of methacrylic acid such as methyl methacrylate, ethyl methacrylate, propyl methacrylate, n-butyl methacrylate, t-butyl methacrylate, isobutyl methacrylate, pentyl methacrylate, hexyl methacrylate, cyclohexyl methacrylate, 2-ethylhexyl methacrylate, isobornyl methacrylate, heptyl methacrylate, cycloheptyl methacrylate, octyl methacrylate, iso-octyl methacrylate, nonyl methacrylate, decyl methacrylate, lauryl methacrylate, eicosyl methacrylate and the like and mixtures thereof. Suitable free-radical polymerizable olefinic acids include acrylic acid, methacrylic acid, fumaric acid, crotonic acid, itaconic acid, 2-acryloxypropionic acid, and the like and mixtures thereof.

Optional ethylenically-unsaturated monomers suitable for use in the polymeric additive include, for example, styrene, alpha-methyl styrene, vinyl toluene, acrylonitrile, methacrylonitrile, ethylene, vinyl acetate, vinyl chloride, vinylidene chloride, acrylamide, methacrylamide 2-cyanoethyl acrylate, 2-cyanoethyl methacrylate, dimethylaminoethyl methacrylate, dimethylaminopropyl methacrylate t-butylaminoethyl methacrylate, glycidyl acrylate, glycidyl methacrylate, benzyl acrylate, benzyl methacrylate, phenyl acrylate, phenyl methacrylate and the like. The amount of the polymeric additive used may be in the range of about 1% to about 55% by weight, based on the total weight of the adhesive composition. Such low molecular weight additives as described in U.S. Pat. No. 4,912,169, the disclosure of which is hereby incorporated by reference.

Crosslinking Agent

The adhesive may be crosslinked during post curing of the adhesive during or after coating. This can be achieved via covalent crosslinking such as heat, actinic or electron beam radiation, or metal based ionic crosslinking between functional groups. Table 1 below lists the types of crosslinkers for the various functional groups of the acrylic and/or oligomer.

TABLE 1

| Functional Group of Acrylic or Oligomer | Crosslinker |
|---|---|
| Silane | Self-reactive |
| Hydroxyl | Isocyanate, Melamine Formaldehyde, Anhydride, Epoxy, Titanium esters and Chelates |
| Carboxylic acid, phosphoric acid | Aziridines, Isocyanate, Melamine Formaldehyde, Anhydride, Epoxy, Carboiimides, Metal Chelates, Titanium esters and Oxazolines |
| Isocyanate | Self-reactive, Carboxylic acid, Amine, Hydroxyl |
| Vinyl | Addition reaction with Silicone hydride |
| (Meth)acrylate | Amine, Mercaptan, Self-reactive with radical catalyst (UV, Thermal), Acetoacetate |
| Epoxy | Amine, Carboxylic acid, Phosphoric acid, Hydroxyl, Mercaptan |
| Amine | Isocyanate, Melamine formaldehyde, anhydride, epoxy, acetoacetate |
| Mercapto | Isocyanate, Melamine formaldehyde, Anhydride, Epoxy |
| Acetoacetate | Acrylate, Amine |

In one embodiment, the crosslinking agent comprises a titanium chelate having the general formula:

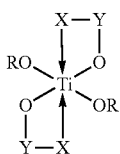

(VI)

wherein X is a functional group containing oxygen or nitrogen; Y is alkylene of 1 to 6 carbon atoms or arylalkyl; and R is H, alkyl or 1 to 6 carbon atoms or hydroxy substituted alkyl of 1 to 6 carbon atoms. The titanium chelate crosslinking agent may alternatively have the general formula:

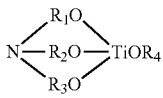

(VII)

wherein $R_1$, $R_2$ or $R_3$ can be the same or different, and is alkylene of 1 to 4 carbon atoms, and $R_4$ is alkyl or 1 to 6 carbon atoms. An example of a useful titanium chelate is triethanolamine titanate, available under the trade name Tyzor® from DuPont.

Suitable polyfunctional aziridines include, for example, trimethylolpropane tris[3-aziridinylpropionate]; trimethylolpropane tris[3-(2-methylaziridinyl)propionate]; trimethylolpropane tris[2-aziridinylbutyrate]; tris(1-aziridinyl)-phosphine oxide; tris(2-methyl-1-aziridinyl)phosphine oxide; penta-erythritoltris[3-(1-aziridinyl)propionate]; and pentaerythritol tetrakis[3-(1-aziridinyl)propionate]. Combinations of more than one polyfunctional aziridine may also be used. Examples of commercially available polyfunctional aziridines include NEOCRYL CX-100 from Zeneca Resins, believed to be trimethylolpropaten tris[3-(2-methylaziridinyl)-propanoate], and Xama-2, Xama-7 and Xama-220 from Bayer Material Science.

Multifunctional aziridine amides that have the general formula:

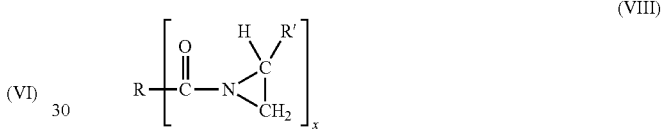

(VIII)

wherein R can be either an alkylene or aromatic group and R' can be a hydrogen or alkyl group and x is at least 2. Examples of suitable multifunctional aziridine amides include 1,1'-(1,3-phenylenedicarbonyl)bis[2-methyl aziridine]; 2,2,4-trimethyladipoyl bis[2-ethyl aziridine]; 1,1'-azelaoyl bis[2-methyl aziridine]; and 2,4,6-tris(2-ethyl-I-aziridinyl)-1,3,5 triazine.

Metal chelate crosslinking agents may be compounds prepared by coordinating multivalent metals such as Al, Fe, Zn, Sn, Ti, Sb, Mg and V with acetylacetone or ethyl acetoacetonate.

Among the isocyanate crosslinking agents that can be used are aromatic, aliphatic and cycloaliphatic diisocyanates and triisocyanates. Examples include 2,4-toluene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, xylene diisocyanate, 1,6-hexamethylene diisocyanate, 1,10-decamethylene diisocyanate, 1,4-cyclohexylene diisocyanate, 4,4'methylene bis(cyclohexyl isocyanate), 1,5-tetrahydronaphthalene diisocyanate, paraxylylene diisocyanate, durene diisocyanate, 1,2,4-benzene diisocyanate, isoform diisocyanate, 1,4-tetramethylxylene diisocyanate, 1,5-naphthalene diisocyanate, or their reactants with polyol such as trimethylolpropane.

Other useful crosslinking agents include monomeric and polymeric melamine crosslinkers, such as Cymel 303 and 370 available from Cytec.

The crosslinking agent is typically used at a level from about 0.05% to about 5%, or from about 0.075% to about 2%, or from about 0.1% to about 1.5% by weight of adhesive solids.

Examples of amino group-containing alkoxysilanes having a primary amino group alone as a reactive group include aminoalkyltrialkoxysilanes such as aminomethyltrimethoxysilane, aminomethyltriethoxysilane, β-aminoethyltrimethoxysilane, β-aminoethyltriethoxysilane, γ-aminopropyltrimethoxysilane, γ-aminopropyltriethoxysilane, γ-aminopropyltripropoxysilane, γ-aminopropyltriisopropoxysilane, and γ-aminopropyltributoxysilane; (aminoalkyl)alkyldialkoxysilanes such as β-aminoethylmethyldimethoxysilane, γ-aminoethylmethyldiethoxysilane, γ-aminopropylmethyldimethoxysilane, γ-aminopropylmethyldiethoxysilane, and γ-aminopropylmethyldipropoxysilane; and corresponding aminoalkyldialkyl(mono)alkoxysilanes.

Examples of amino group-containing alkoxysilanes having a primary amino group and a secondary amino group as reactive groups include N-(aminoalkyl)aminoalkyltrialkoxysilanes such as N-β-(aminoethyl)-γ-aminopropyltrimethoxysilane and N-β-(aminoethyl)-γ-aminopropyltriethoxysilane; and N-(aminoalkyl)aminoalkylalkyldialkoxysilanes such as N-β-(aminoethyl)-γ-aminopropylmethyldimethoxysilane and N-β-(aminoethyl)-γ-aminopropylmethyldiethoxysilane.

Examples of amino group-containing alkoxysilanes having a secondary amino group alone as a reactive group include N-phenylaminomethyltrimethoxysilane and N-phenyl-β-aminoethyltrialkoxysilanes such as N-phenyl-β-aminoethyltrimethoxysilane and N-phenyl-β-aminoethyltriethoxysilane; N-phenyl-γ-aminopropyltrialkoxysilanes such as N-phenyl-γ-aminopropyltrimethoxysilane, N-phenyl-γ-aminopropyltriethoxysilane, N-phenyl-γ-aminopropyltripropoxysilane, and N-phenyl-γ-aminopropyltributoxysilane; corresponding N-phenylaminoalkyl(mono- or di-)alkyl (di- or mono-)alkoxysilanes; as well as N-alkylaminoalkyltrialkoxysilanes corresponding to the above-listed amino group-containing alkoxysilanes having a secondary amino group substituted with phenyl group, such as N-methyl-3-aminopropyltrimethoxysilane, N-ethyl-3-aminopropyltrimethoxysilane, N-n-propyl-3-aminopropyltrimethoxysilane, N-n-butyl-aminomethyltrimethoxysilane, N-n-butyl-2-aminoethyltrimethoxysilane, N-n-butyl-3-aminopropyltrimethoxysilane, N-n-butyl-3-aminopropyltriethoxysilane, and N-n-butyl-3-aminopropyltripropoxysilane, and corresponding N-alkylaminoalkyl(mono- or di-)alkyl(di- or mono)alkoxysilanes. Others include N-cyclohexylaminomethylmethyldiethoxysilane and N-cyclohexylaminomethyltriethoxysilane.

Examples of the mercapto group-containing silanes include mercaptoalkyltrialkoxysilanes such as mercaptomethyltrimethoxysilane, mercaptomethyltriethoxysilane, β-mercaptoethyltrimethoxysilane, β-mercaptoethyltriethoxysilane, β-mercaptoethyltripropoxysilane, β-mercaptoethyltriisopropoxysilane, β-mercaptoethyltributoxysilane, γ-mercaptopropyltrimethoxysilane, γ-mercaptopropyltriethoxysilane, γ-mercaptopropyltripropoxysilane, γ-mercaptopropyltriisopropoxysilane, and γ-mercaptopropyltributoxysilane; (mercaptoalkyl)alkyldialkoxysilanes such as β-mercaptoethylmethyldimethoxysilane, β-mercaptoethylmethyldiethoxysilane, γ-mercaptopropylmethyldimethoxysilane, γ-mercaptopropylmethyldiethoxysilane, γ-mercaptopropylmethyldipropoxysilane, β-mercaptopropylmethyldiisopropoxysilane, γ-mercaptopropylmethyldibutoxysilane, γ-mercaptopropylethyldimethoxysilane, γ-mercaptopropylethyldiethoxysilane, γ-mercaptopropylethyldipropoxysilane, γ-mercaptopropylethyldiisopropoxysilane, and γ-mercaptopropylethyldibutoxysilane; and corresponding (mercaptoalkyl)dialkyl(mono)alkoxysilanes.

Examples of hydroxyl-functional silanes include hydroxymethyltrialkoxy silanes having the formula:

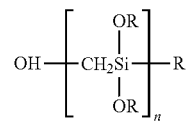

Where R is an alkyl group and n is at least 1. The alkyl group is preferably a lower alkyl group having 1 to 6 carbon atoms, and preferably 1 to 3 carbon atoms. Particularly useful are the silanes in which the alkyl group is methyl or ethyl, namely hydroxymethyltriethoxysilane and hydroxymethyltrimethoxysilane when n in formula IX is equal to 1.

In one embodiment, the crosslinker acts as a catalyst for the oligomer, such that an external catalyst is not required. For example, aluminum acetoacetonate acts as a crosslinker for the acrylic polymer and as a catalyst for the silyl functional groups of the silyl terminated polyether oligomer.

In one embodiment, the pressure sensitive adhesive further comprises a moisture scavenger, also referred to as a viscosity stabilizer. Examples of useful scavengers include ortho esters such as trimethyl orthoacetate and triethyl orthoformate; oxazolidine compounds such as 3-ethyl-2-methyl-2-(3-methylbutyl)-1,3-oxazolidine, and silanes such as vinyl trimethoxysilane. Suitable moisture scavengers also include small molecule siloxanes that do not contain hydrogen abstractable moieties, such as various alkoxy poly(alkoxysilanes) wherein the alkoxy group has from 1 to 10 carbon atoms or 1 to 6 carbon atoms. Examples include isobutyltriethoxysilane, isobutyltrimethoxysilane, n-octylsilane, methyltrimethoxysilane, trimethylmethoxysilane, n-octyltrimethoxysilane, dimethyldimethoxysilane, trimethylmethosysilane, n-propyltrimethoxysilane, tetraethylorthosilicate, dimethylketoximosilane, and the like. While tetrafunctional organosilanes provide better moisture scavenging efficiency per mole, trifunctional silanes are preferred because they provide adequate moisture scavenging efficiency and provide better overall properties in adhesives due to lower crosslinking densities. Other examples include alkyl isopropenoxy silanes such as dimethyl diisopropenoxy silane, methyl triisopropenoxy silane, γ-glycidoxypropyl methyl diisopropenoxy silane and the like, alkoxy silanes having functional groups such as γ-glycidoxypropyl methyl dimethoxy silane, γ-glycidoxypropyl trimethoxy silane (GLYMO), 3-ureidopropyltrimethoxy silane and n-trimethoxysilylmethyl-o-methylcarbamate. The silane compounds, in addition to being moisture scavenging, provide enhanced adhesive properties, including increased elongation and tensile strength. The silane compounds may also serve as adhesion promoters and act as coupling agents.

Additional moisture scavengers include trimethylorthoacetate and trimethylorthoformate. The moisture scavenger may be added to any of the components prior to mixing or to the polymerization reaction of the base polymer. Useful amounts of moisture scavengers are in the range of about 0.01% to about 15% by weight, or 0.1% to about 5% by weight, or about 0.5% to about 3% by weight.

The adhesives of the present invention may further comprise additives such as pigments, fillers, plasticizer, diluents, antioxidants, and the like. Pigment, if desired, is provided in an amount sufficient to impart the desired color to the adhesive. Examples of pigments include, without limitation, solid inorganic fillers such as carbon black, titanium dioxide and the like, and organic dyes. Additional inorganic fillers such as aluminum trihydrate, christobalite, glass fibers, kaolin, precipitated or fumed silica, copper, quartz, wollasonite, mica, magnesium hydroxide, silicates (e.g. feldspar), talc, nickel and calcium carbonate are also useful. Metal oxides such as aluminum trihydrate and magnesium hydroxide are particularly useful as flame retardants and, unexpectedly, for improving cohesive strength, particularly at elevated temperatures.

In one embodiment, the pressure sensitive adhesive is formed from a blend comprising: (a) about 30-90% by weight of an acrylate polymer having at least one crosslinkable functional group, the acrylate polymer having a Tg less than 20° C. and a molecular weight greater than 20,000; (b) about 5-50% by weight of an oligomer having at least one crosslinkable functional group, wherein the oligomer is liquid at room temperature; and (c) at least one crosslinking agent; wherein at least one of (a) and (b) is crosslinked in the presence of the other. The pressure sensitive adhesive may further comprise 10-30% by weight of a tackifier.

In one embodiment, the pressure sensitive adhesive is formed from a blend comprising about 30-65% by weight of an acrylic polymer having crosslinkable carboxyl functional groups and silyl functional groups; about 10-25% by weight of a polyether having crosslinkable silyl functional groups; about 15-30% by weight of a terpene phenolic tackifier; and about 0.05 to 1.0% by weight of an aluminum chelate crosslinking agent.

EXAMPLES

The following test methods were used for evaluating the adhesive properties of the adhesives.

Tape Performance Test Methods

| Test | Condition |
|---|---|
| 180° Peel | a, b, c |
| 15 Minute Dwell | |
| 24 Hour Dwell | |
| 72 Hour Dwell | |
| Shear Strength | d, e, f |
| Shear Adhesion Failure Temp. (SAFT) | g, h | a Peel, sample applied to a stainless steel panel with a 5 pound roller with 1 pass in each direction. Samples conditioned and tested at 23° C.
b Peel, sample applied to a polypropylene panel with a 5 pound roller with 5 passes in each direction. Samples conditioned and tested at 23° C.
c Peel, sample applied to a high density polyethylene with a 5 pound roller with 5 passes in each direction. Samples conditioned and tested at 23° C.
d 70° C. Shear: 5 pound weight with a 1 inch by 1 inch overlap (5 pounds/square inch). Sample backed with 2-mil polyethylene terephthalate to prevent foil tear and applied to a stainless steel panel with a 10 pound roller with 5 passes in each direction. Samples conditioned for 15 minutes at 70° C. and before applying weight. Temperature maintained at 70° C. throughout test.
e Shear: 10 pound weight with a 1 inch by 1 inch overlap (10 pounds/square inch). Sample backed with 2-mil polyethylene terephthalate to prevent foil tear and applied to a stainless steel panel with a 10 pound roller with 5 passes in each direction. Samples conditioned and tested at 23° C.
f Shear: 10 pound weight with a 1 inch by ½ inch overlap (20 pounds/square inch). Sample applied to a stainless steel panel with a 10 pound roller with 5 passes in each direction. Samples conditioned and tested at 23° C.
g High Temperature Shear: 1000 gram weight, 1 inch by 1 inch overlap (2.2 pounds/square inch). Sample backed with a 2-mil polyethylene terephthalate to prevent foil tear and applied to a stainless steel panel with a 10 pound roller with 5 passes in each direction. Samples conditioned for 1 hour at 23° C. and 15 minutes at 40° C. Temperature increased by 0.5° C./min. until failure.
h High Temperature Shear: 5 pound weight, 1 inch by 1 inch overlap (5 pounds/square inch). Sample backed with a 2-mil polyethylene terephthalate to prevent foil tear and applied to a stainless steel panel with a 10 pound roller with 5 passes in each direction. Samples conditioned for 1 hour at 23° C. and 15 minutes at 40° C. Temperature increased by 0.5° C./min. until failure.

The following examples are intended only to illustrate methods and embodiments in accordance with the invention, and as such should not be construed as imposing limitations upon the claims.

Example 1

Preparation of Acrylic Base Polymer

An acrylic base polymer having a reactive functionality is prepared as follows. Into a 100 gallon reactor equipped with a heating jacket, agitator, reflux condenser, feed tanks and nitrogen gas inlet there is charged 64.28 lbs. ethyl acetate and 3.50 lbs. isopropyl alcohol. The monomers are added in the following amounts:

41.14 lbs. 2-ethyl hexyl acrylate 6.92 lbs. methyl acrylate 47.59 lbs. vinyl acetate 0.10 lbs. methacroyloxypropyl trimethoxy silane 2.28 lbs. acrylic acid.

The reactor charge is heated to reflux conditions (reactor jacket 85° C.) with a constant nitrogen purge. Once solvent reflux is attained, an initiator solution of 0.15 lbs. benzoyl peroxide and 1.41 lbs. ethyl acetate is added to the reactor. After a peak temperature of 78-83° C. is attained, the reaction conditions are maintained for 10 minutes. A reagent feed mixture of 83.44 lbs. ethyl acetate, 4.40 lbs. isopropyl alcohol, 61.56 lbs. 2-ethyl hexylacrylate, 10.38 lbs. methyl acrylate, 3.43 lbs. acrylic acid and 0.23 lbs. benzoyl peroxide is added over a period of two hours to the reactor. The reaction conditions are maintained for 0.5 hour after completion of the reagent feed. The finishing reagents of 17.5 lbs. methyl acrylate, 50 lbs. ethyl acrylate and 1.00 lbs. of Vazo 64 are added to the reactor over one hour. The reaction conditions are maintained for 1 hour, after which the reactor contents are cooled to about 55° C. The dilution solvents of 8.65 lbs. methanol, 25.00 lbs. toluene and 25.00 lbs. isopropyl alcohol are then added.

The resulting acrylic polymer contains 53.95% 2-ethyl hexyl actylate, 18% methyl acrylate, 25% vinyl acetate, 0.05% methacroyloxypropyl trimethoxysilane and 3% acrylic acid, based on 100% by weight of the acrylic polymer. The molecular weight (Mw) of the acrylic polymer is 330,802 (determined by gel permeation chromatography relative to polystyrene standards) and the polydispersity is 6.73.

Example 2

Preparation of Adhesive Composition

An adhesive composition is prepared using the acrylic polymer of Example 1. The following ingredients are added with agitation until a homogeneous mixture is attained:

TABLE 2

| Ingredient | Wet weight (gms) | Solids Weight (gms) | % Adhesive Solids | % Total Solids |
|---|---|---|---|---|
| Base Polymer (Ex. 1) | 2300 | 821.18 | 54.65 | 46.45 |
| Tackifier[1] | 500.26 | 375.20 | 25 | 21.25 |

TABLE 2-continued

| Ingredient | Wet weight (gms) | Solids Weight (gms) | % Adhesive Solids | % Total Solids |
|---|---|---|---|---|
| Oligomer[2] | 901.14 | 300.16 (SAX 725) 264.75 (S-11) | 20 | 17 |
| AAA crosslinker[3] | 68.25 | 5.25 | 0.35 | 0.30 |
| Total | 3765.65 | 1500.79 (adhesive) 1765.54 (total) | 100 | 100 |

[1]SP-553 in toluene
[2]SAX 725/S-11, paste produced by high shear mixing of the liquid oligomer mixed with aluminum trihydroxide (S-11) in the presence of toluene
[3]AAA solution: 1 pt. aluminum acetylacetonate/3 pts. 2,4-pentanedione/9 pts toluene.

Example 3

Preparation of Adhesive Composition

An adhesive composition is prepared as in Example 2, with the exception that aluminum trihydroxide (S-11) is not used.

TABLE 3

| Ingredient | Wet weight (gms) | Solids Weight (gms) | % Adhesive Solids |
|---|---|---|---|
| Base Polymer (Ex. 1) | 2300 | 821.18 | 54.65 |
| Tackifier[1] | 500.26 | 375.20 | 25 |
| SAX 725 | 300.16 | 300.16 | 20 |
| AAA crosslinker[2] | 68.25 | 5.25 | 0.35 |
| Total | 3168.67 | 1500.79 (adhesive) | 100 |

[1]SP-553 in toluene
[2]AAA solution: 1 pt. aluminum acetylacetonate/3 pts. 2,4-pentanedione/9 pts toluene.

Example 4

Preparation of Acrylic Base Polymer

An acrylic base polymer is produced in the same manner as Example 1, but with reduced isopropyl alcohol in the reaction yielding a higher molecular weight distribution. The molecular weight (Mw) of the acrylic polymer is 376,423 (determined by gel permeation chromatography relative to polystyrene standards) and the polydispersity is 7.77.

Example 5

Preparation of Adhesive Composition

An adhesive composition is prepared using the acrylic polymer of Example 4. The following ingredients are added with agitation until a homogeneous mixture is attained:

TABLE 4

| Ingredient | % Adhesive Solids |
|---|---|
| Base Polymer (Ex. 4) | 54.65 |
| Tackifier[1] | 25 |
| SAX 725 | 20 |
| AAA Crosslinker[2] | 0.35 |
| Total | 100 |

[1]SP-553 in toluene
[2]AAA solution: 1 pt. aluminum acetylacetonate/3 pts. 2,4-pentanedione/9 pts toluene.

Example 6

Preparation of Acrylic Base Polymer

An acrylic base polymer is prepared in the same manner as Example 1, with the exception that maleic anhydride is used in place of acrylic acid, and the methacroyloxypropyl trimethoxysilane is increased to 0.1%. The resulting acrylic polymer contains 54.90% 2-ethylhexyl acrylate, 18% methyl acrylate, 25% vinyl acetate, 0.1% methacroyloxypropyl trimethoxysilane and 2% acrylic acid, based on 100% by weight of the acrylic polymer.

The molecular weight (Mw) of the acrylic polymer is 258,610 (determined by gel permeation chromatography relative to polystyrene standards) and the polydispersity is 6.86.

Example 7

Preparation of Adhesive Composition

An adhesive composition is prepared using the acrylic polymer of Example 6 and a titanium crosslinker. The following ingredients are added with agitation until a homogeneous mixture is attained:

TABLE 5

| Ingredient | % Adhesive Solids |
|---|---|
| Base Polymer (Ex. 6) | 54.65 |
| Tackifier[1] | 25 |
| SAX 725 | 20 |
| Titanium Crosslinker[2] | 0.35 |
| Total | 100 |

[1]SP-553 in toluene
[2]Tyzor GBA: acetylacetonate titanate chelate

Example 8

Preparation of Adhesive Composition

An adhesive composition is prepared using the acrylic polymer of Example 6. The following ingredients are added with agitation until a homogeneous mixture is attained:

TABLE 6

| Ingredient | % Adhesive Solids |
|---|---|
| Base Polymer (Ex. 6) | 53015 |
| Tackifier[1] | 24.30 |
| SAX 725 | 19.45 |

TABLE 6-continued

| Ingredient | % Adhesive Solids |
|---|---|
| Titanium Crosslinker[2] | 0.34 |
| JEFFAMINE ® M-2005[3] | 2.76 |
| Total | 100 |

[1]SP-553 in toluene
[2]Tyzor GBA: acetylacetonate titanate chelate
[3]A 2000 molecular weight polypropylene oxide monoamine produced by Huntsman.

The adhesive composition of Example 8 is dried at 130° C. for 5 minutes to graft the M-2005 to the base polymer backbone.

Example 9

Preparation of Adhesive Composition

An adhesive composition is prepared as in Example 3, with the exception that 1.34 gms (0.9%) glycidyloxypropyltrimethoxy silane (GLYMO) is added as a viscosity stabilizer. The viscosity of the adhesive is initially 3,768 cps, and remains stable after heating at 50° C. for 4 days.

Example 10

Preparation of Adhesive Composition

An adhesive composition is prepared as in Example 3, with the exception that 1.34 gms (0.9%) vinyl trimethoxysilane is added as a viscosity stabilizer. The viscosity of the adhesive is initially 3 548 cps, and remains stable after heating at 50° C. for 4 days.

Test Results

The adhesives are coated onto 2-mil aluminum foil at 58-65 grams per square meter (gsm) and dried.

TABLE 7

| Test | Ex. 2[++] | Ex. 3[++] | Ex. 5[+] | Ex. 7[+] | Ex. 8[++] | Ex. 9[++] | Ex. 10[++] |
|---|---|---|---|---|---|---|---|
| (a) 180 peel to stainless steel 15 min dwell (lb/in) | 6.50 | 7.40 | 7.55 | 5.48 | 6.45 | 5.78 | 7.29 |
| (a) 180 peel to stainless steel 24 hours dwell (lb/in) | 11.30 | 9.80 | 9.70 | 8.07 | 8.87 | 10.37 | 11.23 |
| (a) 180 peel to stainless steel 96-360 hours dwell (lb/in) | 14.70 | 11.30 | 10.71 | 9.37 | 10.61 | — | — |
| (b) 180 peel to polypropylene 15 min dwell (lb/in) | — | — | 4.60 | 3.46 | 3.12 | — | — |
| (b) 180 peel to polypropylene 24 hours dwell (lb/in) | — | — | — | — | — | — | — |
| (b) 180 peel to polypropylene 96-360 hours dwell (lb/in) | — | — | 4.60 | 3.40 | 3.22 | — | — |
| (c) 180 peel to HDPE 15 min dwell (lb/in) | — | — | 2.20 | 2.21 | 2.79 | — | — |
| (c) 180 peel to HDPE 24 hours dwell (lb/in) | — | — | — | — | — | — | — |
| (c) 180 peel to HDPE 96-360 hours dwell (lb/in) | — | — | 2.12 | 2.05 | 2.77 | — | — |
| (e) Static Shear ½ X1 in 10 lb/in² on stainless (min.) | >20,000 | 5,277 | >20,000 | >20,000 | 547 | — | — |
| (f) Static Shear ½ X1 in 20 lb/in² on stainless (min.) | — | — | 2,340 | >5,000 | — | — | — |
| (d) 70° C. shear (min.) | >1,000 | 95 | >7,000 | >10,000 | — | >1,400 | 160.5 |
| (g) SAFT 2.2 lb/in² (° C.) | >200° C. | >200° C. | >200° C. | >200° C. | — | — | — |
| (h) SAFT 5 lb/in² (° C.) | — | — | — | >200° C. | — | — | — |

[+]Dried at 120° C. for 5 minutes
[++]Dried at 130° C. for 5 minutes

A comparison of Example 2 to Example 3 demonstrates the utility of the aluminum trihydrate in improving shear and temperature resistance without a reduction in ultimate adhesion.

The tested performance of Example 7 demonstrates the high temperature resistance obtained by the anhydride/titanium crosslinking mechanism.

Example 11

Preparation of Acrylic Base Polymer

An acrylic base polymer having reactive functionality is prepared as follows:
1. Prepare the Mixes Below:

| Mix I: | 2 EthylHexyl Acrylate | 418.10 gms | |
|---|---|---|---|
| | Methyl Acrylate | 90.00 gms | |
| | Vinyl Pyrrolidone | 30.00 gms | |
| | Isobornyl Methacrylate | 60.00 gms | |
| | Maleic Anhydride (10% Toluene) | 9.50 gms | (0.95 gms) |
| | XL-36 (12.5% in toluene) | 7.60 gms | (0.95 g monomer) |
| | Trimethylorthoacetate | 6.00 gms | |
| | Hexane-S | 60.00 gms | |
| | Ethyl Acetate | 167.00 gms | |
| | Toluene | 151.80 gms | |
| | | 1000.00 gms | |

| Reactor Charge | Addition |
|---|---|
| 300.00 gms of Mix I | 700.00 gms of Mix I |
| 20.00 gms Hexane | 0.77 gms Lauryl Peroxide |
| 0.40 gms Lauryl Peroxide | |

2. Add the 320.40 grams of the Reactor Charge Mix to a preheated 2-liter jacketed reactor [jacket at 85° C.] equipped with a reflux condenser and a nitrogen sparge needle [a constant $N_2$ sparge of about ~300 cc maintained].
3. Allow batch to exotherm to peak temperature with a vigorous reflux and begin addition of remaining mix.
4. Add Monomer addition [700.77 gms] over 2 hours maintaining reflux [jacket at 85° C.].
5. React 1 hour.
6. Add finishing reagents over 30 minutes
   Finishing Reagents:
   50 gms Ethyl Acetate
   1.50 gms t-amyl peroxypivalate (75% in odorless mineral spirits)
7. React 1 hour.
8. Begin cooling and add 20 gms of Ethanol.

The resulting polymer contains 69.68% 2-ethyl hexylacrylate, 15% methyl acrylate, 5% vinyl pyrolidone, 0.16% maleic anhydride, 10.00% isobornyl methacrylate and 0.16% XL-36 methacrolyloxymethyltriethoxysilane [Wacker Silicones]. The polymer composition has a solids content of 52.9% and a viscosity of 5632 centipoise. The molecular weight of the polymer is Mw=307,000 and Mn=75,500 and the polydispersity is 4.1.

Example 12

Preparation of Segmented Acrylic Oligomer Having Anhydride Functionality Using SFRP Agent An acrylic copolymer with reactive functionalities positioned in the segment adjacent to the polymer chain ends is prepared as follows. Into a 2000 ml reactor equipped with a heating jacket, agitator, reflux condenser, feed tanks and nitrogen gas inlet there is charged 302.33 g of butyl acetate. Monomers and SFRP agent are added in the following amounts to generate a portion of the non-reactive segment at the center of the polymer chain of the reactive polymer mode.
   238.59 g of n-butyl acrylate
   59.65 g of t-butyl acrylate
   15.96 g of BlocBuilder® functionalized 1,3-butanediol diacrylate (SFRP agent)

The reactor charge is heated to greater than 65° C. (reactor jacket 70° C.) with a constant nitrogen purge and held for 30 minutes. After the hold the reactor charge mixture is heated to 120° C. (reactor jacket 130° C.). After a peak temperature of 120-125° C. is reached, the reaction conditions are maintained for 30 minutes. A reagent feed mixture with an active nitrogen purge of 129.49 g ethyl acetate and 574.94 g n-butyl acrylate, and 143.73 g t-butyl acrylate is added over a period of ninety minutes to the reactor. During the reagent feed, the temperature of the reaction is held at 118-122° C. The reaction conditions are maintained after completion of the reagent feed until a conversion of 56% of n-butyl/t-butyl acrylate is achieved. This is to create the remainder of the non-reactive segment at the center of the polymer, the total theoretical Mn of the non-reactive segment is 35,000 g/mol. At this time, 6.51 g of maleic anhydride are added and reaction conditions are maintained until a conversion of 80% of n-butyl/t-butyl acrylate is achieved creating a reactive segment of theoretical Mn=7,500 g/mol. This creates a first mode of reactive polymer of theoretical Mn=50,000 g/mol. At 80% conversion 6.72 g of n-dodecyl mercaptan are added and reaction conditions are maintained until a conversion of n-butyl/t-butyl acrylate of greater than 98% is achieved to create a non-reactive polymer mode of theoretical Mn=12,500 g/mol. The resulting solution polymer is then cooled to ambient temperature and discharged from the reactor.

The resulting reactive acrylic polymer mode contains 99.30% n-butyl/t-butyl acrylate and 0.70% maleic anhydride based on 100% by weight of the reactive acrylic polymer mode. The resulting non-reactive polymer mode contains 100% of n-butyl/t-butyl acrylate. The measured molecular weight determined by gel permeation chromatography relative to polystyrene standards of the total acrylic polymer is Mw=94,464, Mn=23,916. The solids content is 72.08, the viscosity is 11,340 cps and the polydispersity is 3.95.

Example 13

Preparation of Adhesive with Maleic Anhydride in the Acrylate Polymer and Acrylate Oligomer An adhesive is produced by mixing the Base Polymer of Example 11, oligomer, tackifier solution, aziridine crosslinker, and tin catalyst into a homogeneous solution as follows:

TABLE 8

| Ingredient | Wet weight (gms) | Solids Weight (gms) | Adhesive Solids % |
|---|---|---|---|
| Base Polymer[1] | 43.58 | 23.05 | 64.58% |
| Antioxidant[2] | 7.10 | 3.55 | 9.95% |
| Oligomer[3] | 12.0 | 8.88 | 24.88% |

TABLE 8-continued

| Ingredient | Wet weight (gms) | Solids Weight (gms) | Adhesive Solids % |
|---|---|---|---|
| Aziridine crosslinker[4] | 0.36 | 0.04 | 0.10% |
| Tin Catalyst[5] | 2.31 | 0.18 | 0.49% |
| Total | 65.35 | 35.7 | 100% |

[1]Base polymer described in Example 11
[2]Polymeric Antioxidant: Wingstay L [50% concentration in toluene].
[3]Oligomer Described in Example 12.
[4]CX100 multifunctional aziridine solution [10% in ethyl acetate].
[5]Dibutyl tin diacetylacetonate as a 1 part(dibutyl tin): 3 parts(2,4-pentanedione): 9 parts (toluene) solution.

The mixture is coated onto aluminum foil. The coat weight is about 60 grams/square meter. The sample is placed in an oven at 135° C. for 5 minutes. The properties of the adhesive are shown below.

| 180 Peel SS 15 min (lb/in) | 180 Peel SS 24 H (lb/in) | 180 Peel SS 15 min (lb/in) | Shear ¼ sq. in., 1 kg rm temp (min) | SAFT 1 kg (° C.) | SAFT 5 lbs (° C.) |
|---|---|---|---|---|---|
| 4.89 | 4.62 | 5.57 | 250.9 | 90.6 | 67.6 |
| 4.96 | 4.59 | 5.57 | 251.9 | 95.3 | 68.6 |
| 5.11 | 5.05 | 6.21 | 301.2 | 97.7 | 69.7 |

Example 14

Preparation of Acrylic Base Polymer

An acrylic base polymer having reactive functionality is prepared as follows:
1. Prepare the Mixes Below:

| Mix I: | n-Hexyl Acrylate | 337.50 gms |
|---|---|---|
| | Isobornyl Acrylate | 314.00 gms |
| | Methyl Acrylate | 75.00 gms |
| | Maleic Anhydride | 15.00 gms |
| | Acrylic Acid | 7.50 gms |
| | Isopropyl Alcohol | 100.00 gms |
| | Ethyl Acetate | 150.00 gms |
| | | 1000.00 gms |

| Reactor Charge | Addition |
|---|---|
| 300.00 gms of Mix I [Heat to reflux] | 700.00 gms of Mix I |
| 30.00 gms ethyl acetate | 0.80 gms Lauryl Peroxide |
| 0.40 gms Lauryl Peroxide | |

2. Add the 330.40 grams of the Reactor Charge Mix to a preheated 2-liter jacketed reactor [jacket at 85° C.] equipped with a reflux condenser and a nitrogen sparge needle [a constant N₂ sparge of about ~300 cc maintained].
3. Allow batch to exotherm to peak temperature with a vigorous reflux and begin addition of remaining portion of Mix I [700 gms] plus 0.80 gms lauryl peroxide over 2 hours maintaining reflux [jacket at 85° C.].
4. React 15 minutes.
5. Add finishing reagents over 30 minutes Finishing Reagents:
  50 gms Ethyl Acetate
  1.50 gms t-amyl peroxypivalate (75% in odorless mineral spirits)
6. React 1 hour.
7. Begin cooling.

The resulting polymer contains 45% n-hexylacrylate, 42% isobornyl acrylate, 10% methyl acrylate, 2.0% maleic anhydride and 1.0% acrylic acid. The polymer composition has a solids content of 69.4% and a viscosity of 7,756 centipoise. The molecular weight of the polymer is Mw=94,000 and Mn=31,300 and the polydispersity is 3.0.

Example 15

Preparation of Acrylic Base Polymer

An acrylic base polymer is prepared substantially in accordance with Example 14 with the exception that a portion of the Isopropyl Alcohol is replaced with Ethyl Acetate.

The resulting polymer contains 45% n-hexylacrylate, 42% isobornyl acrylate, 10% methyl acrylate, 2.0% maleic anhydride and 1.0% acrylic acid. The polymer composition has a solids content of 68.1% and a viscosity of 20,200 centipoise. The molecular weight of the polymer is Mw=162,200 and Mn=43,300 and the polydispersity is 3.7.

Example 16

Preparation of Adhesive with Acrylate Polymer Containing Maleic Anhydride and a Silyl-Terminated Polyurethane Oligomer An adhesive is produced by mixing the Base Polymer of Example 11, oligomer, antioxidant solution, aminosilane crosslinker, and tin catalyst into a homogeneous solution as follows:

TABLE 9

| Ingredient | Wet weight (gms) | Solids Weight (gms) | Adhesive Solids % |
|---|---|---|---|
| Base Polymer[1] | 37.12 | 25.77 | 62.74% |
| Antioxidant[2] | 8.00 | 4.00 | 10.00% |
| Oligomer[3] | 10.0 | 10.00 | 25.00% |
| XL-926 crosslinker[4] | 0.28 | 0.028 | 0.07% |
| Toluene | 10 | 0 | 0% |
| Tin Catalyst[5] | 2.60 | 0.2 | 0.50% |
| Total | 68 | 40 | 100% |

[1]Base polymer described in Example 14
[2]Polymeric Antioxidant: Wingstay L [50% concentration in toluene].
[3]Silyl-Terminated Polyurethane [SPUR 1050] oligomer from Momentive Performance materials.
[4]XL-926: N-Cyclohexylaminimethyltriethoxysilane from Wacker [10% in toluene].
[5]Dibutyl tin diacetylacetonate as a 1 part(dibutyl tin): 3 parts(2,4-pentanedione): 9 parts (toluene) solution.

The mixture is coated onto 2-mil polyester substrate. The coat weight is about 60 grams/square meter. The sample is placed in an oven at 135° C. for 5 minutes. The properties of the adhesive are shown below.

| 180 Peel SS 15 min (lbs/in) | 180 Peel SS 24 H (lbs/in) | 180 Peel SS 182 H (lbs/in) | Shear ¼ sq. in., 1 kg rm temp (min) |
|---|---|---|---|
| 6.07 | 6.63 | 6.91 | >10,000 |
| 6.11 | 6.63 | 7.08 | >10,000 |
| 6.05 | 6.63 | 6.90 | >10,000 |

Example 17

Preparation of Adhesive with Acrylate Polymer Containing Maleic Anhydride and a Silyl-Terminated Polyurethane Oligomer An adhesive is produced by mixing the Base Polymer of Example 11, oligomer, antioxidant solution, aminosilane crosslinker, and titanium crosslinker/silane catalyst into a homogeneous solution as follows:

TABLE 10

| Ingredient | Wet weight (gms) | Solids Weight (gms) | Adhesive Solids % |
|---|---|---|---|
| Base Polymer[1] | 35.73 | 24.81 | 31.37 |
| Base Polymer[2] | 36.43 | 24.81 | 31.37% |
| Antioxidant[3] | 11.064 | 5.532 | 7.00% |
| Oligomer[4] | 23.72 | 23.72 | 30.00% |
| XL-926 crosslinker[5] | 0.5 | 0.05 | 0.06% |
| Toluene | 10 | 0 | 0% |
| Titanium Cross-linker/Catalyst[6] | 2.05 | 0.158 | 0.20% |
| Total | 119.494 | 79.08 | 100% |

[1]Base polymer described in Example 14
[2]Base polymer described in Example 15
[3]Polymeric Antioxidant: Wingstay L [50% concentration in toluene].
[4]Silyl-Terminated Polyurethane [SPUR 1050] oligomer from Momentive Performance materials.
[5]XL-926: N-Cyclohexylaminimethyltriethoxysilane from Wacker [10% in toluene].
[6]Dibutyl tin diacetylacetonate as a 1 part (dibutyl tin): 3 parts(2,4-pentanedione): 9 parts (toluene) solution.

The mixture is coated onto 2-mil polyester substrate. The coat weight is about 60 grams/square meter. The sample is placed in an oven at 135° C. for 5 minutes. The properties of the adhesive are shown below.

| 180 Peel SS 15 min (lbs/in) | 180 Peel SS 24 H (lbs/in) | 180 Peel SS 168 H (lbs/in) | Shear ¼ sq. in., 1 kg rm temp (min) |
|---|---|---|---|
| 4.70 | 5.21 | 5.30 | >2,400 |
| 4.69 | 5.07 | 5.13 | >2,400 |
| 4.83 | 5.24 | 5.52 | >2,400 |

Example 18

Preparation of Adhesive with Silyl Terminated Acrylate Oligomer

An adhesive is prepared substantially in accordance with Example 16 with the exception that the maleic anhydride functional oligomer is replaced with OR100S, a silyl-terminated acrylate oligomer available from the Kaneka Corporation.

Example 19

Preparation of Adhesive with Silyl Terminated Acrylate Oligomer

An adhesive is prepared substantially in accordance with Example 16 with the exception that the silyl terminated polyurethane oligomer is replaced with OR100S, a silyl-terminated acrylate oligomer available from the Kaneka Corporation.

Example 20

Preparation of Adhesive with Silyl Terminated Acrylate Oligomer

An adhesive is prepared substantially in accordance with Example 3 with the exception that the silyl terminated polypropylene oxide oligomer is replaced with OR100S, a silyl-terminated acrylate oligomer available from the Kaneka Corporation.

The pressure sensitive adhesives may be used in adhesive articles such as labels, tapes, sheets, decorative appliqués, and the like. Suitable substrates serving as adhesive carriers or facestocks to which the adhesive may be applied include non-woven material, such as, for example, paper, plastic, metal or foam; woven material, such as, for example, woven cotton or woven synthetic polymers. Non-limiting examples synthetic polymers include polyethylene, polypropylene, polyvinyl chloride, polyester and polyamide. The adhesive may be applied to the substrate by any conventional method, including extrusion, spraying, roll coating, curtain coating, etc.

In addition to pressure sensitive adhesives, the composition may be used to form foam articles such as foam carriers and tapes, and foam adhesives. In one embodiment, a foam article is formed from a blend comprising (a) the acrylate polymer (b) the liquid oligomer and (d) expandable microspheres or a blowing agent; wherein at least one of (a) and (b) is crosslinked in the presence of the other.

The foam layer may comprise from about 5% to about 70% by volume, or from about 5% to about 45% by volume of microspheres. The microspheres are generally in the size range of about 10 microns to about 300 microns, and may be solid, hollow or porous.

The microspheres may be expandable microspheres such as the EXPANCEL® expandable microspheres available from Expancel, Inc. These microspheres are small spherical plastic particles. The microspheres consist of a polymer shell encapsulating a gas. When the gas inside the shell is heated, it increases its pressure and the thermoplastic shell softens, resulting in a dramatic increase in the volume of the microspheres. When fully expanded, the volume of the microspheres may increase more than 40 times their original size. The expansion temperature of such polymeric microspheres may range from about 60° C. to about 200° C., or from about 80° C. to about 180° C.

In one embodiment, the microspheres are fully expanded prior to addition. In another embodiment, the microspheres are expanded after they have been blended into the acrylic/oligomer composition.

Blowing agents can be selected from a broad range of materials, including hydrocarbons, ethers, esters and partially halogenated hydrocarbons, ethers and esters, and the like. Typical physical blowing agents have a boiling point between about −50° C. and about 100° C. Exemplary physical blowing agents include the CFC's (chlorofluorocarbons) such as 1,1-dichloro-1-fluoroethane, 1,1-dichloro-2,2,2-trifluoro-ethane, monochloro-difluoromethane, and 1-chloro-1,1-difluoroethane; the FC's (fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the FE's (fluoroethers) such as methyl-1,1,1-trifluoroethylether and difluoromethyl-1,1,1-trifluoroethylether; and hydrocarbons such as n-pentane, isopentane, and cyclopentane.

Example 21

Preparation of Foam Substrate

A foam substrate is prepared by blending with agitation a acrylic base polymer, an oligomer, a tackifier solution, silane and expandable microspheres in the following amounts:

TABLE 11

| Ingredient | Wet weight (gms) | Solids Weight (gms) | Solids % |
| --- | --- | --- | --- |
| Base Polymer[1] | 130.77 | 51.00 | 69.68 |
| Tackifier Soln.[2] | 5.97 | 4.18 | 5.71 |
| Oligomer[3] | 13.92 (100% solids) | 13.92 | 19.02 |
| AAA crosslinker[4] | 6.79 | 0.52 | 0.71 |
| A-187[5] | 1.42 (100% solids) | 1.42 | 1.94 |
| Expancel 930 du 120[6] | 2.15 (100% solids) | 2.15 | 2.94 |
| Total | 161.02 | 73.19 | 100 |

[1]Compositially same as Base Polymer of Ex. 1, with exception that Mw = 406,900 and polydispersity = 6.5
[2]Tackifier: SP553 as a 70% solution in toluene.
[3]SAX 400: Sily-Terminated polyether.
[4]AAA solution: 1 part aluminum acetylacetonate/12 parts toluene.
[5]Gylcidyloxypropyltrimethoxy silane sold by Momentive Performance Materials.
[6]Expandable microspheres from Expancel.

The composition is coated onto a release liner and allowed to dry for ten minutes. The coat weight is 100 gms/m². The sample is placed in an oven at a temperature of 120° C. for 10 minutes. The coated film is then folded onto itself to double the thickness and placed in an oven at a temperature of 140° C. for an additional 5 minutes to completely expand the microspheres. The film was folded onto itself again to double the thickness and passed through a roller laminator for a final film thickness of 0.02 inches (0.051 cm). The foam has the following properties:

| Property | Result |
| --- | --- |
| Tensile at 100% Elongation | 4.00 lbs. |
| Tensile at Break | 6.30 lbs |
| Elongation At Break | 255% |

Example 22

Preparation of Foam Pressure Sensitive Adhesive

An acrylic base polymer is prepared substantially in accordance with Example 1 using the following monomers (% by weight):

45% n-hexyl acrylate
42% isobornyl acrylate
10% methyl acrylate
2% maleic anhydride
1% acrylic acid The polymeric composition has a solids content of 68.1% in an 83.6% ethyl acetate/16.4% isopropyl alcohol solvent.

An inherently tacky foam-like material is produced by mixing with agitation the acrylic base polymer described above, oligomer, tackifier solution, silane, aluminum trihydrate powder, and expandable microspheres in the amounts shown below. The Tyzor GBA solution is then added and mixed until the catalyst solution is evenly dispersed.

TABLE 12

| Ingredient | Wet Weight (gms) | Solids Weight (gms) | Solids % |
| --- | --- | --- | --- |
| Base Polymer[1] | 66.08 | 45.00 | 50.47 |
| Tackifier[2] | 29.41 | 20.74 | 23.26 |
| Oligomer[3] | 16.59 (100% solids) | 16.59 | 18.60 |
| Tyzor GBA crosslinker solution[4] | 8.09 | 0.62 | 0.70 |
| A-187[5] | 1.08 (100% solids) | 1.08 | 1.21 |
| Expancel 930 du 120[6] | 2.57 (100% solids) | 2.57 | 2.88 |
| S-11[7] | 2.57 (100% solids) | 2.57 | 2.88 |
| Total | 126.39 | 89.17 | 100 |

[1]Base Polymer has an Mw of 162,200 and a polydispersity of 3.7.
[2]Tackifier: SP553 as a 70% solution in toluene.
[3]SAX 400: Sily-Terminated polyether.
[4]Tyzor GBA solution: 1.33 parts Tyzor GBA/11.67 parts toluene.
[5]Gylcidyloxypropyltrimethoxy silane from Momentive Performance Materials.
[6]Expandable microspheres sold by Expancel.
[7]S-11 is a 0.25 micron particle size aluminum trihydroxide powder.

The composition is coated onto release liner and allowed to dry for ten minutes. The coat weight is about 100 grams/square meter. The sample is placed in an oven at 120° C. for 10 minutes. The film is then folded onto itself to double thickness and the expandable microspheres are completely expanded by placing the doubled film in an oven at 140° C. for an additional 5 minutes. The film is folded onto itself to again double the thickness and passed through a roller laminator for a final film thickness of 0.02 inches (0.051 cm). The properties of the foam adhesive are shown below:

| Property | Result |
| --- | --- |
| Tensile at 100% Elongation | 4.1 lb. |
| Tensile at Break | 4.8 lb. |
| Elongation At Break | 400% |
| 180° peel to stainless steel 15 min dwell (lb/in) | 12.54 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:
1. A pressure sensitive adhesive comprising:
 (a) an acrylate polymer having at least one crosslinkable functional group, the acrylate polymer having a Tg less than 20° C. and a molecular weight ($M_w$) greater than 20,000;

(b) an oligomer having at least one crosslinkable functional group, wherein the oligomer is liquid at room temperature and has a Tg of less than 25° C.; and (c) at least one crosslinking agent;

wherein at least one of (a) and (b) is crosslinked in the presence of the other, and wherein the oligomer is selected from the group consisting of polyether, polyisobutylene, poly-alpha-olefin, polybutadiene, polyisoprene, polydimethylsiloxane, polyalkyloxazoline, polyester, and polyurethane.

2. The pressure sensitive adhesive of claim 1 wherein the crosslinking agent is selected from the group consisting of aluminum acetylacetonate, polyamine, and multivalent metal complexes.

3. The pressure sensitive adhesive of claim 1 wherein the crosslinkable functional group of the acrylate polymer is selected from the group consisting of anhydride, silyl, hydroxyl, carboxyl, isocyanato, vinyl, (meth)acryl, epoxy, amino, mercapto, and acetoacetyl.

4. The pressure sensitive adhesive of claim 1 wherein the Tg of the acrylate polymer is less than 0° C.

5. The pressure sensitive adhesive of claim 1 wherein the oligomer has silyl functional groups.

6. The pressure sensitive adhesive of claim 1 further comprising a compatible tackifier.

7. The pressure sensitive adhesive of claim 6 wherein the tackifier is selected from the group consisting of hydrocarbon resins, wood resins, rosins, rosin derivatives, and combinations of two or more thereof.

8. The pressure sensitive adhesive of claim 1 wherein the acrylate polymer is formed from a monomer mixture comprising at least one macromonomer.

9. The pressure sensitive adhesive of claim 8 wherein the macromonomer comprises at least one crosslinkable functional group.

10. The pressure sensitive adhesive of claim 1 further comprising one or more of a moisture scavenger, an inorganic filler or a low molecular weight additive.

11. The pressure sensitive adhesive of claim 10 wherein the low molecular weight additive comprises a polymer having a softening point greater than about 40° C. and a number average molecular weight less than about 35,000 wherein the polymer is polymerized from monomers selected from the group consisting of $C_1$-$C_{20}$ alkyl and cycloalkyl acrylates, $C_1$-$C_{20}$ alkyl and cycloalkyl methacrylates, free-radical polymerizable olefinic acids, and other ethylenically unsaturated monomers selected from the group consisting of styrene, alpha-methyl styrene, vinyl toluene, acrylonitrile, methacrylonitrile, ethylene, vinyl acetate, vinyl chloride, vinylidene chloride, acrylamide, methacrylamide, 2-cyanoethyl acrylate, 2-cyanoethyl methacrylate, dimethylaminoethyl methacrylate, dimethylaminopropyl methacrylate, t-butylaminoethyl methacrylate, glycidyl acrylate, glycidyl methacrylate, benzyl acrylate, benzyl methacrylate, phenyl acrylate, and phenyl methacrylate.

12. The adhesive of claim 1 comprising:

(a) about 30-90% by weight of the acrylate polymer;

(b) about 5-50% by weight of the liquid oligomer, and optionally (d) about 10% to about 30% by weight of a compatible tackifier, based on the total weight of the presure sensitive adhesive.

13. A pressure sensitive adhesive comprising:

(a) an acrylate polymer having a Tg less than 20° C. and a molecular weight ($M_w$) greater than 20,000; and (b) an oligomer having at least one crosslinkable functional group, wherein the oligomer is liquid at room temperature and has a Tg of less than 25° C.; and wherein at least one of (a) and (b) is crosslinked in the presence of the other, the crosslinkable functional group of the oligomer is selected from the group consisting of anhydride, hydroxyl, carboxyl, isocyanato, vinyl, (meth)acryl, epoxy, amino, mercapto, and acetoacetyl.

14. A foam material formed from a blend comprising the pressure sensitive adhesive of claim 1 and expandable microspheres or a blowing agent.

15. The foam material of claim 14 wherein the microspheres are fully expanded.

16. The foam material of claim 14 further comprising a tackifier.

17. A foam material formed from a blend comprising the pressure sensitive adhesive of claim 13 and expandable microspheres or a blowing agent.

18. The foam material of claim 17 wherein the microspheres are fully expanded.

19. The foam material of claim 17 further comprising a tackifier.

20. The pressure sensitive adhesive of claim 1 wherein the acrylate polymer has a molecular weight (Mw) greater than about 50,000.

21. The pressure sensitive adhesive of claim 1 wherein the acrylate polymer has a molecular weight (Mw) greater than about 100,000.

22. The pressure sensitive adhesive of claim 1 wherein the pressure sensitive adhesive exhibits a storage modulus (G') of less than the Dahlquist criterion value of $3 \times 10^6$ dynes/cm$^2$ at 25° C.

23. The pressure sensitive adhesive of claim 1 wherein the acrylate polymer is a free radical acrylate polymer.

24. The pressure sensitive adhesive of claim 1 wherein the crosslinking agent is selected from the group consisting of aluminum acetylacetonate, polyamine, multivalent metal complexes, isocyanate, monomeric and polymeric melamine, anhydride, titanium esters and chelates, aziridines, carbodiimides, metal chelates, and oxazolines.

25. The pressure sensitive adhesive of claim 1 wherein the crosslinkable functional group of the oligomer is selected from the group consisting of anhydride, silyl, hydroxyl, carboxyl, isocyanato, vinyl, (meth)acryl, epoxy, amino, mercapto, and acetoacetyl.

26. The pressure sensitive adhesive of claim 1 wherein the oligomer has a molecular weight (Mw) within the range of about 500 to about 100,000.

27. The pressure sensitive adhesive of claim 1 wherein the oligomer has a molecular weight (Mw) within the range of about 3000 to about 50,000.

28. The pressure sensitive adhesive of claim 13 wherein the acrylate polymer has a molecular weight (Mw) greater than about 50,000.

29. The pressure sensitive adhesive of claim 13 wherein the acrylate polymer has a molecular weight (Mw) greater than about 100,000.

30. The pressure sensitive adhesive of claim 13 wherein the oligomer has a molecular weight (Mw) within the range of about 500 to about 100,000.

31. The pressure sensitive adhesive of claim 13 wherein the oligomer has a molecular weight (Mw) within the range of about 3000 to about 50,000.

32. The pressure sensitive adhesive of claim 13 wherein the acrylate polymer includes at least one crosslinkable functional group, the crosslinkable functional group is selected from the group of consisting of anhydride, silyl, hydroxyl, carboxyl, isocyanato, vinyl, (meth)acryl, epoxy, amino, mercapto, and acetoacetyl.

33. The pressure sensitive adhesive of claim 13 wherein the oligomer is selected from the group consisting of (meth) acrylate, polyether, polyisobutylene, poly-alpha-olefin, polybutadiene, polyisoprene, polydimethylsiloxane, polyalkyloxazoline, polyester, and polyurethane.

34. The pressure sensitive adhesive of claim 1 wherein the pressure sensitive adhesive exhibits a single Tg at a temperature between the glass transition temperatures of (a) and (b) indicative of a homogeneous/miscible mixture.

35. The pressure sensitive adhesive of claim 1 wherein the functional group of the oligomer is reactive with the functional group of the acrylate polymer.

36. The pressure sensitive adhesive of claim 1 wherein the functional group of the oligomer is self-reactive.

* * * * *